Sept. 5, 1933.　　　　　F. H. OWENS　　　　　1,925,600
TALKING PICTURE APPARATUS
Filed Nov. 6, 1929　　　2 Sheets-Sheet 1
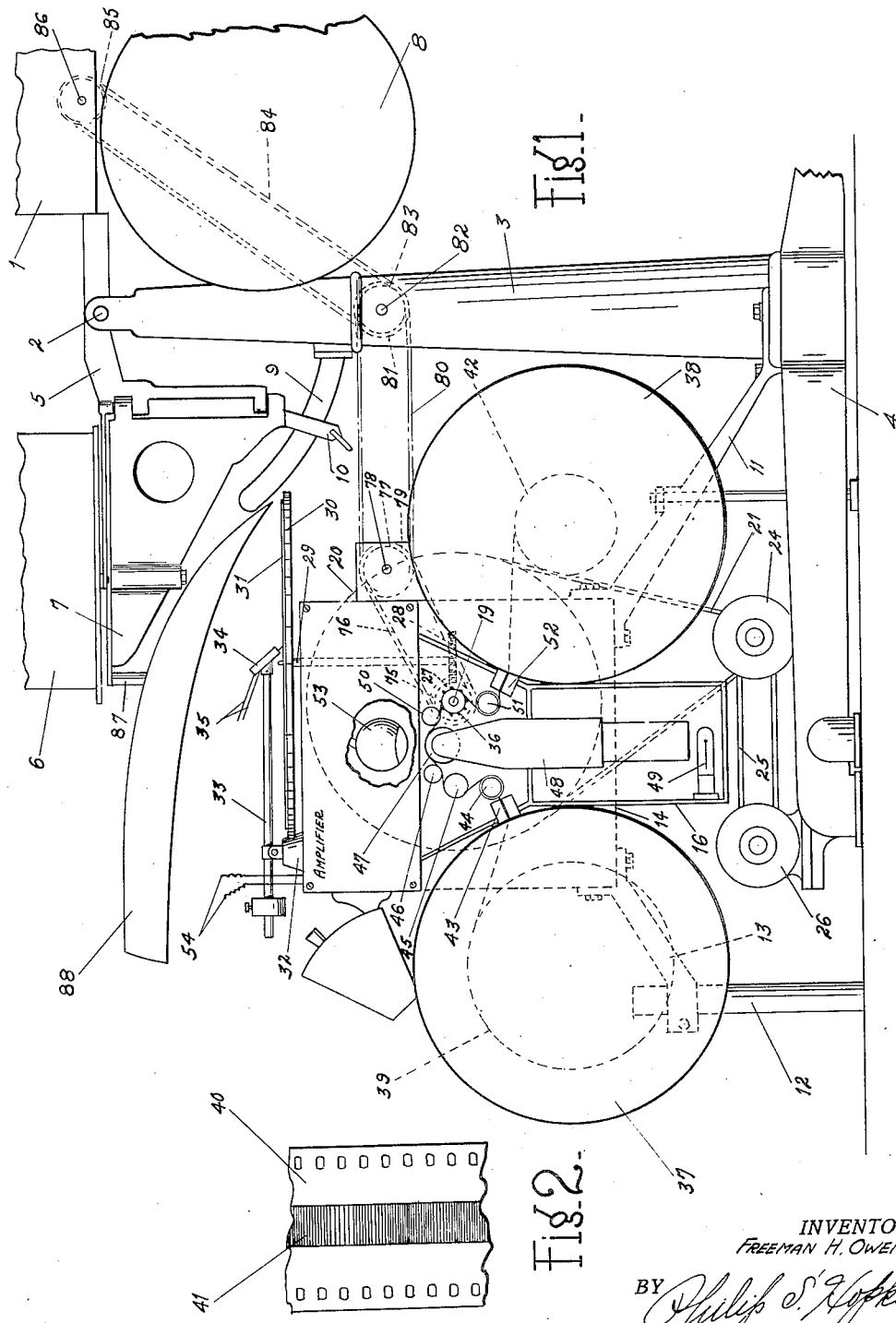
INVENTOR.
FREEMAN H. OWENS.
BY Philip S. Hopkins
ATTORNEY.

Sept. 5, 1933.  F. H. OWENS  1,925,600
TALKING PICTURE APPARATUS
Filed Nov. 6, 1929  2 Sheets-Sheet 2
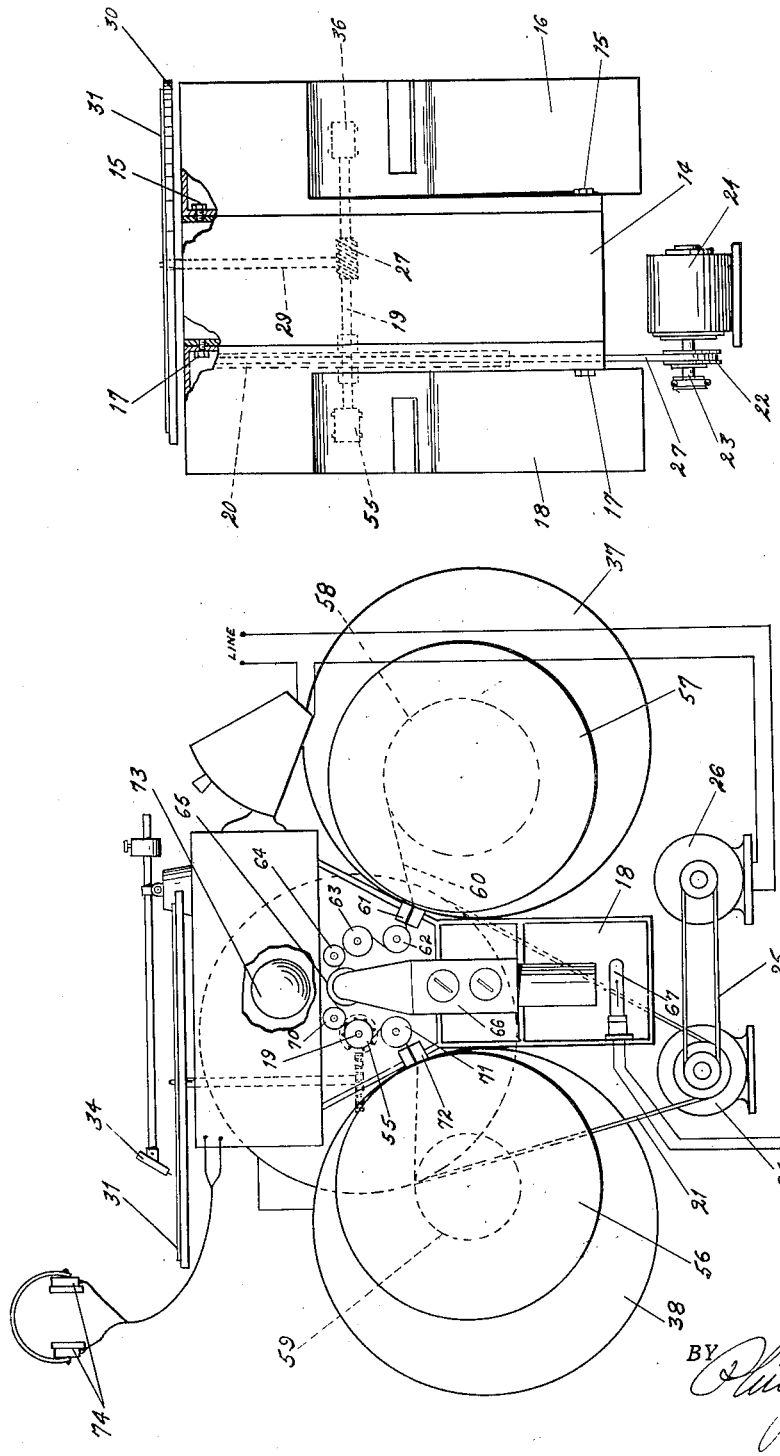
INVENTOR.
FREEMAN H. OWENS.
BY Philip S. Hopkins
ATTORNEY.

Patented Sept. 5, 1933

1,925,600

UNITED STATES PATENT OFFICE 1,925,600

TALKING PICTURE APPARATUS

Freeman H. Owens, New York, N. Y.

Application November 6, 1929. Serial No. 405,229

4 Claims. (Cl. 88—16.2)

My invention relates to a talking picture apparatus and has for its primary object, the provision of a single unitary structure embodying in combination with a motion picture projector, a photographic sound recording and reproducing means and a phonograph reproducing means.

My invention is particularly useful for theatres inasmuch as it provides in addition to the usual motion picture projector, which may or may not have a photographic sound attachment embodied therein for reproducing a sound record on the same film with the pictures, a photographic sound reproducing mechanism for reproducing sound from a film independent of the picture film and synchronously therewith, and in addition provides a phonographic sound reproducing means for synchronous operation with a motion picture. Furthermore, my apparatus can be utilized in the theatre for reproducing sound either photographically or phonographically independent of a picture film if desired.

My invention is useful in a laboratory where talking motion pictures are being produced in that it includes as a part of the unitary structure a photographic sound recording means which may be used to record sound originating in a microphone or other translating device or which may record upon film, the sound reproduced from the phonographic sound portion of the apparatus.

Another and important object of my invention lies in the provision of a single driving means for the photographic sound reproducing, recording and phonographic sound reproducing mechanism, and from which driving means may be synchronously driven the motion picture projector and its sound attachment if any.

Referring now to the figures of the accompanying drawings forming a part of this application and wherein like reference numerals indicate like parts:—

Figure 1 is a side view of a portion of a motion picture projector and illustrating my invention in combination therewith.

Figure 2 is a detailed view of a section of motion picture film having a sound record thereon.

Figure 3 is a partially diagrammatic side view of my apparatus taken from the opposite side from that shown in Figure 1.

Figure 4 is a rear end view of my apparatus, certain parts being broken away for clearness.

In carrying out my invention, I provide in combination with a standard motion picture projecting machine indicated at 1, and part only of which is shown as the conventional type of projector is used, pivotally supported as at 2 at the upper end of a standard 3 having the usual base 4. The pivoted arm 5 carrying the projector head at one end, has pivotally mounted at its opposite end the usual lamp housing 6 mounted upon the usual depending bracket 7. A film take up magazine 8 is shown attached to the underside of the projector head 1 in the usual manner. Pivotal adjustment for the head 1 and the lamp housing 6 is provided by means of the usual guide arm 9 engageable with which is a clamping member 10 carried by the bracket 7.

It will be noted and understood that the projector may be provided with any one of the numerous types of photographic sound reproducing attachments designed to reproduce the sound record carried by the picture film.

Supported partly by the base 4 through the medium of an arm 11 and partly by legs 12 through the medium of arms 13 is a casing 14 on one side of which is secured as by screws or bolts 15 a housing 16 and to the opposite side of which is secured also as by screws or bolts 17 a housing 18.

Suitably journaled in the walls of the casing 14 and extending on either side thereof into the housings 16 and 18 is a shaft 19 upon which is mounted within the housing 18 adjacent the rear wall thereof a large pulley balance wheel 20 adapted to receive rotary motion through the medium of a belt 21 extending around a pulley 22 on the shaft 23 of a governor 24, such shaft being rotated by means of a belt 25 from a motor 26 suitably mounted with respect to the casing 14.

Secured upon the shaft 19 within the casing 14 is a worm 27 meshing with a worm gear 28 on the lower end of a shaft 29, said shaft extending upwardly through the top of the casing 14 and adapted to receive at its upper end a turntable 30 upon which may be placed a phonograph disk sound record 31. Suitably mounted upon the top of the casing 14 is a support 32 to which is pivoted pickup arm 33 carrying the pickup or reproducing device 34 at one end for engagement with the sound record 31. Electrical connection through the medium of wires 35 may be provided between the pickup 34 and suitable amplifying means the output of which is connected as usual to loud speakers whereby the reproduced sound from the record 31 may be rendered audible.

The end of the shaft 19 projecting into the housing 16 is provided with a sprocket 36. Suitably secured and supported upon each side of the housing 16 are film magazines 37 and 38 the former serving as a supply magazine for a roll 39 of film 40 bearing a photographic sound record 41 thereon for reproduction. The magazine 38 houses a takeup roll 42 upon which the film 40 is wound after reproduction. The film 40 is fed from the supply roll 39 through the mouth 43 of the magazine 37, passing around idler rollers 44, 45 and 46 to a roller support 47 carried at the end of a vertically disposed housing 48 suitably mounted within the housing 16 and containing the usual optical elements (not shown) for focusing rays of light from a lamp 49 disposed at the bottom of the housing 16 in alignment with the end of the optical unit 48, upon the film 40 and the sound record 41 thereon, at a point on the periphery of the roller 47, such roller support being shown and described in detail in my copending application Serial #397,504 filed October 5, 1929 as is also the details of the optical system contained in the unit 48, and reference to which is hereby made for such details.

The film 40 is maintained in contact with the roller support 47 by means of the idler roller 46 on one side and the idler roller 50 on the opposite side from which the film extends and engages with the sprocket 36 on the end of the shaft 19 whereby the film is pulled over the support 47 and is fed to the takeup roll 42 around an idler 51 and into the mouth 52 of the magazine 38. Thus as the shaft 19 is rotated through the medium of the motor 26, the belt 31 and balance wheel 20, the film 40 will be uniformly moved by the sprocket 36 over the roller film support 47 where the light from the lamp 49 is modulated by sound record 41 on the film, the modulated light rays passing to a photo electric cell or other light sensitive device 53, suitably located within the upper portion of the housing 16. This upper portion of the housing 16 may also if desired, contain the photo electric cell amplifier (not shown) of one or two stages as desired, the output from which is fed through wires 54 to the usual amplifier and loud speakers whereby the translated photographic sound record is rendered audible.

The opposite end of the shaft 19 extending into the housing 18, also carries a film sprocket 55. The housing 18 also suitably supports upon either side thereof film magazines 56 and 57, the latter housing a film supply roll 58 and the magazine 56 housing a film takeup roll 59. The sensitized photographic film 60 is led outwardly through the mouth 61 of the magazine 57 over idler rollers 62, 63 and 64 and thence over the roller film support 65 supported at the end of the optical unit 66 at the lower end of which is disposed a suitable recording lamp 67 the intensity of which may be modulated by the output of an amplifier 68 of a sound translating device such as a microphone 69 or if desired of the magnetic pickup device 34 if it is desired to record on the film 60 a reproduced sound from the phonograph disk record 31, or from the reproduced film sound record 41. The usual optical recording system is contained within the unit 66 and as the sensitized film 60 is moved over the support 65, the sound modulated light rays from the lamp 67 are recorded on the film. The film 60 is maintained in engagement with the roller support 65 by the idler roller 64 on one side and the idler roller 70 on the other side. After passing the idler 70 the film engages with the sprocket 55 which serves to pull the film over said support and from which the film is fed over the idler 71 through the mouth 72, into the takeup magazine 56.

If it is desired to listen in during the recording thus described, a photo electric cell 73 may be provided in alignment with the optical unit 66, and on the opposite side of the film 60 at the point of translation, said cell 73 receiving the modulated light from the lamp 67 as it is recorded upon and passes through the film 60. The output of the cell 73 is connected with a suitable amplifier (not shown), preferably disposed in the upper portion of the housing 18. The output of this amplifier may have suitable connection to ear phones 74 whereby the operator may listen to the recording of the sound on the film 60.

It will be understood also, of course, that by changing the lamp 67 to a reproducing lamp, this recording unit may also be utilized as a reproducer.

If desired, the projector mechanism may be driven also from the motor 26 through the medium of a chain sprocket 75 suitably mounted upon the shaft 19 through the medium of a chain 76 passing over a sprocket 77 on a shaft 78 suitably journaled on the casing 14 and on which shaft is a second sprocket 79 around which engages a chain 30 driving a sprocket 81 on a shaft 82 suitably supported by the standard 3 and upon which shaft is a second sprocket 83 around which passes an endless chain 84 to a sprocket 85 on the shaft 86 controlling the projector drive.

Suitably supported as by the depending bracket 87 from the lamp housing bracket 7 is a cover 88 overlying the turntable 30 and disk record 31 thereon whereby the same are protected against particles of carbon or other foreign matter which might drop from the lamp housing 6 thereon.

Of course, many changes may be made in details of construction and arrangement of parts without departing from the spirit and scope of my invention. I do not limit myself, therefore, to the exact form herein shown and described other than by the appended claims.

I claim:

1. In combination, a shaft, driving means therefor, a plurality of sprockets on said shaft, a phonograph turntable, means for driving said turntable from said shaft, a plurality of optical units for the reproduction and recording of photographic sound records, and means including said sprockets for simultaneously moving films past and in operative relation to said units, the movement of said sprockets and said turntable being synchronous.

2. In combination, a shaft, driving means therefore, a plurality of sprockets on said shaft, a phonograph turntable, means for driving said turntable from said shaft, a plurality of optical units for the reproduction and recording of photographic sound records, and means including said sprockets for simultaneously moving films past and in operative relation to said units, the movement of said sprockets and said turntable being synchronous, a motion picture projector, and driving means for said projector from said shaft.

3. In combination, an inner casing and two outer casings secured to the sides thereof, a shaft supported in said casings and terminating at its ends in said outer casings, driving means for said shaft, sprockets on said shaft in said outer casings, optical units for the reproduction and recording of photographic sound records, in said outer casings, and means including said sprockets for moving films past and in operative relation to said units, a phonograph turntable, and means on said shaft in said inner casing for driving said turntable synchronously with said sprockets.

4. In combination, an inner casing and two outer casings secured to the sides thereof, a shaft supported in said casings and terminating at its ends in said outer casings, driving means for said shaft, sprockets on said shaft in said outer casings, optical units for the reproduction and recording of photographic sound records, in said outer casings, and means including said sprockets for moving films past and in operative relation to said units, a phonograph turntable, and means on said shaft in said inner casing for driving said turntable synchronously with said sprockets, a motion picture projector and driving means therefor connected to said shaft.

FREEMAN H. OWENS.